United States Patent Office 3,341,598
Patented Sept. 12, 1967

3,341,598
NF₂ ADDUCTS OF ACYCLIC POLYENES
AND THEIR PREPARATION
Richard P. Rhodes, Newark, N.J., assignor to Esso Research and Engineering Company, a corporation of Delaware
No Drawing. Filed Dec. 21, 1960, Ser. No. 77,461
15 Claims. (Cl. 260—583)

The present invention relates to acyclic carbon compounds containing difluoramino, ($NF_2$), groups by addition of $N_2F_4$ to conjugated double bonds in acyclic polyenes (dienes, trienes, and tetraenes).

An object of this invention is to obtain useful fluorine type oxidizers, particularly from highly reactive unsaturated acyclic hydrocarbons in the $C_5$ to $C_{10}$ range for flexibility in choosing components used in rocket propellant composites.

Another object is the preparation of unsaturated monomers which are $NF_2$ adducts of conjugated polyenes and which are adapted for addition polymerization to form $NF_2$-containing binders useful in solid rocket propellant mixtures. Binders which contribute to the energy value while they serve as cohesive agents for imparting physical strength and rigidity are the type herein provided.

The compound 1,2,3,4-tetrakis ($NF_2$) butane was synthesized by reacting bis ($NF_2$) butene with tetrafluorohydrazine, ($N_2F_4$), under suitable conditions as described in U.S. application Ser. No. 5071, filed Jan. 27, 1960, by Richard P. Rhodes.

Work on synthesis of higher molecular weight polyenes having conjugated double bonds was carried out to determine if they could form various adducts of $NF_2$ having advantages in physical and chemical properties and in their preparation.

Unsaturated acyclic hydrocarbons of polyenes containing 2 to 4 conjugated double bonds tend to be more reactive than unsaturated hydrocarbons with isolated double bonds or with all unsaturation or a single carbon, i.e. non-conjugated systems.

The conjugated double bonds link alternate pairs of carbon atoms as in conjugated polyene compounds that follow:

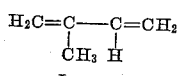

Isoprene

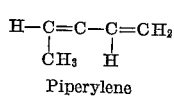

Piperylene

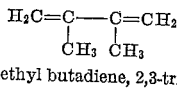

1,3-dimethyl butadiene, 2,3-trimethyl

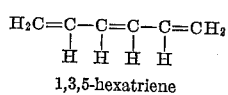

1,3,5-hexatriene

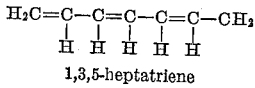

1,3,5-heptatriene

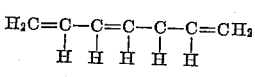

1,3,6-heptatriene

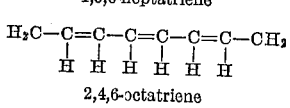

2,4,6-octatriene

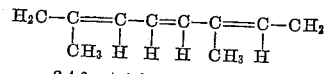

2,4,6-octatriene-2,3-dimethyl

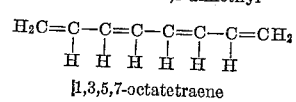

1,3,5,7-octatetraene

A peculiarity discovered about the addition reaction of $N_2F_4$ with the conjugated double bond polyenes is that the addition to the first double bond takes place so rapidly that the conditions of reaction have to be controlled to prevent explosion and disintegration of intermediate reaction products. More stringent conditions are necessary to force addition of $N_2F_4$ to remaining double bonds after forming the bis ($NF_2$) adduct.

In accordance with the present invention, the conjugated double bond polyenes are reacted with $N_2F_4$ in stages under controlled conditions to prevent excessive reaction in the initial stage or stages and to provide appropriate intense conditions for the further reaction in a later stage or later stages.

In the first stage of $N_2F_4$ addition to one of the double bonds, the reaction temperature is kept down preferably in the range of about 20° C., or room temperature, to about 100° C. and the pressure (pounds per square inch absolute) is kept sufficiently low, e.g. about 1 to 15 p.s.i.a. The $N_2F_4$ to polyene mol ratio is generally 1:1 or somewhat higher. In the last stage, the intermediate bis adduct is reacted with more $N_2F_4$ at a higher temperature, or higher pressure, or both higher temperature and pressure, e.g. a temperature of 80° C. to 200° C. and at elevated pressure may be in the range of 15 to 500 p.s.i.a. In a final stage of addition to the second, third or fourth conjugated double bonds the reaction temperature is preferably raised to be in the range of about 100° to 350° C. and the pressure may be elevated to within the range of 300 to 3000 p.s.i.a. In such final stage or ranges the mol ratio of $N_2F_4$ to the intermediate adduct is increased and may be in the range of 5:1 to 20:1 or higher. The preferred conditions depend on the particular conjugated double bond polyene subjected to the reaction and the kind of product desired.

The following examples illustrate the stage-wise reaction procedures befitting various conjugated double bond polyenes and demonstrate the results.

EXAMPLE I

Starting wth 1,3-butadiene in a first stage reaction with $N_2F_4$, 8 mols of $N_2F_4$ were charged per mol of butadiene to the reaction zone. Two runs were made, one at 23° C. under an initial $N_2F_4$ pressure of 486 mm. Hg absolute and the other at 64° C. under the initial $N_2F_4$ pressure of 419 mm. Hg absolute. The bis-$NF_2$ adduct, $C_4H_6$ ($NF_2$)₂ was formed in yields of 90 to 100% based on the butadiene in these runs. At these low temperatures, relatively long reaction periods in the range of 10 to 20 hours are required. The higher temperature levels e.g. of about 100° C., the time of reaction is lowered to an hour or a fraction of an hour.

In the next stage, $N_2F_4$ was supplied for saturation of the second double bond system bis ($NF_2$) adduct reaction product of the first stage. The $N_2F_4$ was supplied at a pressure of 450 p.s.i., and the mixture was reacted for 2 hours at 130° C. to obtain a 91% yield of the tetrakis ($NF_2$) butane product having the formula $C_4H_6(NF_2)_4$. One washing of the crude product with concentrated $H_2SO_4$ purified this product to 96+%. The purified product has the $NF_2$ content required for the formula $C_4H_6(NF_2)_4$ in which both of the double bonds are saturated. The two-stage reaction requirements are important for adding four $NF_2$ groups to $C_5$ conjugated dienes, to isoprene and piperylene. In the first stage these diolefins absorb one mol of $N_2F_4$ per mol of the diene to produce the bis adducts $C_5H_8(NF_2)_2$, under controlled conditions using preferably low reaction temperatures in the range of about 20° to 100° C. and pressures in the range of 1 to 15 p.s.i.a., in saturating only one double bond of the conjugated double bond system. These bis adducts then are reacted with more $N_2F_4$ under the more stringent conditions such as high temperatures in the range of 100 to 350° C. and higher $N_2F_4$ pressures in the range of 15 to 500 p.s.i.a.

EXAMPLE II

In the reaction of piperylene with a mol of $N_2F_4$, suitable reaction conditions are 100° C., 760 mm. Hg abs. For the still higher molecular weight conjugated double bond polyenes, the need for staged addition was found quite as important as it was for the $C_4$ and $C_5$ conjugated diolefins.

An example of the higher $C_6$ to $C_{10}$ conjugated triolefins having at least one pair of conjugated bonds is 1,3,5-hexatriene, which was reacted as shown in the following example.

EXAMPLE III

In reacting 1,3,5-hexatriene with $N_2F_4$ under a pressure of 14 p.s.i.a., at about 20° C., the addition to the first double bond was found to be at a very fast rate. Even after the addition to the first double bond, $N_2F_4$ adds at a fairly rapid rate to the second double bond at slightly higher temperatures e.g., 80 to 130° C., and pressures of 100 to 400 p.s.i.a. In adding more $N_2F_4$ to saturate the third double bond without disintegration of the tetrakis ($NF_2$) adduct (52.8% F., 19.4% N), precautions were found necessary to prevent explosions and tar formation. The addition of $N_2F_4$ to the third double bond goes best at sufficiently elevated temperatures and pressures using a high $N_2F_4$ to the tetrakis adduct ratio. Certain diluents, e.g., $CF_4$, $CCl_4$ and others, are indicated to be helpful in this third stage. Conditions used in three stages are summarized as follows:

TABLE 1.—REACTION CONDITIONS

| Stage | Temp., ° C. | Time (hrs.) | Pressure, p.s.i.a. | Product |
| --- | --- | --- | --- | --- |
| 1st | 90 | 0.25 | 14 | $C_6H_8(NF_2)_2$ |
| 2nd | 93 | 5 | 400 | $C_6H_8(NF_2)_4$ |
| 3rd | 200 | 5.5 | 450 | Heavy Compounds (55.6% F, 20.2% N) |

The heavy compound product obtained in the third stage included polymers of the lower adducts mixed with hexakis ($NF_2$) hexane, $C_6H_8(NF_2)_6$.

As the time of reaction in the third stage was extended, the elemental composition of the product more closely approached the theoretical proportions of F and N required for hexakis (difluoramino) hexane, $$C_6H_8(NF_2)_6$$

i.e., 58% F and 21% N. This product is represented by the structural formula:

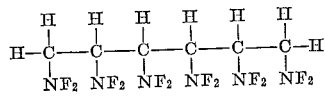

In a similar manner, other $C_6$ to $C_{10}$ conjugated dienes, trienes and tetraenes can be reacted in stages to obtain the intermediate and high number of $NF_2$ groups attached to the carbon atoms. All of these compounds have relatively high energy values, which increase in proportion to the number of $NF_2$ groups.

While for the purpose of increasing the energy values of the polyenes it is desirable to obtain a maximum addition of $NF_2$ groups, the lower adducts, such as the bis or tetrakis adducts of the polyenes having 2 to 4 conjugated double bonds can be used as monomers which are easily polymerized into polymeric binders. This is particularly true of the adducts which contain an unstable double bond group or residual two conjugated double bonds.

The following example illustrates the manner in which a polymerizable $NF_2$ adduct monomer of hexatriene is formed and with this polymer is then easily polymerized to form desired polymers useful as propellant binders.

EXAMPLE IV

As starting material, 1,3,5-hexatriene was reacted with an excess of one mol of $N_2F_4$ per mol of hexatriene at 70° C. under pressures of 0.5 atmospheres absolute for one hour. At the end of the reaction, the hexatriene was initially quantitatively converted to mixed bis isomers of difluoramino hexadiene. The elemental analysis on the recovered product was as follows:

TABLE 2.—ANALYSIS OF A BIS ($NF_2$) HEXADIENE PRODUCT

| Element | Wt. Percent Found | Wt. Percent Theory |
| --- | --- | --- |
| N | 16.7 | 15.2 |
| C | 40.2 | 39.1 |
| H | 4.4 | 4.4 |
| F | 43.9 | 41.3 |

The bis-adduct obtained has additional double bonds that can be reacted. However, under the mild conditions represented by temperatures in the range of about 20° to 100° C., pressures of about 1 to 15 p.s.i.a. and reaction periods of 0.10 to 12 hours or longer as the temperature is lower, only one mol of $N_2F_4$ is added. For instance, using approximately 100° C. as a reaction temperature, complete conversion to the bis-adduct is obtained in about 0.10 to 0.30 hr.

While higher reaction temperatures and pressures can be used for faster rates of reaction, the higher $NF_2$ adducts, tetrakis and hexakis, tend to be formed, thus lowering the amount of polymerizable monomer.

EXAMPLE V

The bis ($NF_2$) hexadiene adduct product recovered from the reaction as described in Example I was allowed to stand at room temperature (about 21° C.) for a period of several days extending into approximately one month in contact with air and in a sealed tube. Traces of $N_2F_4$ and nitrogen oxides were contained in the tube with air. By the end of the month, the bis ($NF_2$) hexadiene was observed to have polymerized to a very viscous oil which from elemental analysis was found to contain two $NF_2$ groups in each of a number ($n$) of recurring polymer units represented by the following structure:

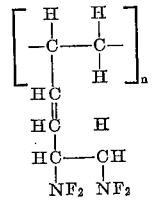

The elemental analysis was obtained on the crude polymer and is accordingly an average for the various isomeric compounds present.

The polymerization time can be reduced by use of various catalysts such as inorganic peroxides, Lewis acids, and various other catalysts. Polymerization rate is also increased by elevating the temperature and pressure.

The preferred isomer for polymerization is indicated to be the 1,2 bis difluoramino hexadiene. This material can be fractionated from the crude bis isomer mixture and this isomer, when separated, polymerizes more readily. The remainder of the bis isomers ($NF_2$) isomers can be subjected to isomerization or a treatment for forming higher adducts.

The principle of isomerization is the use of thermal or radiation energy for altering the configuration of the compounds.

Using the more readily polymerizable isomers, the polymerization takes place more rapidly and results in the formation of gel or semi-solid polymers and solid polymers containing the $NF_2$ groups.

It is not necessary to have the polymers formed initially in a normal solid state for they may be formed as viscous oily polymers still containing unsaturation and can be subjected to reaction with more $N_2F_4$ for adding $NF_2$ to a remaining double bond in the recurring units. This is carried out preferably under higher pressures with the higher pressures in the range of 1 to 30 atmospheres and temperatures ranging from 100° C. up to about 350° C., the reactant polymer being preferably mixed with a diluent, such as benzene, and preferably carbon tetrachloride. A further increase of $NF_2$ content of the polymer makes the polymer of higher molecular weight. In general, the polymers thus formed using the addition polymerization method described have average molecular weights in the range of 1000 to 10,000 or higher and contain from 2 to 4 $NF_2$ groups per polymer unit of 6 to 8 carbon atoms.

The crude polymers or portions of the crude polymers can be used for compounding with other propellant ingredients having high energy values as oxidizers and fuels, such as tetranitromethane, hexanitroethane, ammonium perchlorate and metals such as lithium, boron, beryllium and aluminum to produce solid propellant composites having high specific impulses.

Rocket propellant formulations having high Isp. ratings can be made with bis ($NF_2$) hexadiene polymer and with the heavy $NF_2$ loaded polymers containing one to three $NF_2$ groups per 3 carbon atoms. The heavy $NF_2$ loaded polymers are those formed in the final stage addition of $N_2F_4$ to the hexatriene as shown in Example III. The polymer mixture has close to 1 $NF_2$ group per carbon atom.

In typical formulations that make use of the $NF_2$ loaded conjugated diolefins mixed with their $NF_2$ loaded polymers, these mixtures are used to form about 60 to 70 wt. percent of the composite with 30 to 40 wt. percent of an oxygen-supplying oxidizer, e.g. ammonium perchlorate hexanitroethane, or the like. The composites may also contain some powered metal, e.g. boron, aluminum, or the like in an amount of 1 to 5%. The resulting composites have been indicated to give suitable specific ratings in the range of 270 to 290.

What is claimed is:

1. Bis ($NF_2$) adduct of an acrylic hydrocarbon polyene containing 5 to 10 carbon atoms and 2 to 4 conjugated double bonds in the polyene molecule.
2. Bis ($NF_2$) adduct of isoprene.
3. Bis ($NF_2$) adduct of piperylene.
4. Bis ($NF_2$) adduct of 1,3,5-hexatriene.
5. Tetrakis ($NF_2$) adduct of an acyclic hydrocarbon polyene containing 5 to 10 carbon atoms and 2 to 4 conjugated double bonds in the polyene molecule.
6. Hexakis ($NF_2$) adduct of an acyclic hydrocarbon polyene containing 6 to 10 carbon atoms and 3 to 4 conjugated double bonds in the polyene molecule mixed with polymerized $NF_2$ adduct of the polyene.
7. Hexakis (difluoramino) hexane mixed with polymers of bis- and tetrakis ($NF_2$) adducts of 1,3,5 hexatriene.
8. A polymer of a bis ($NF_2$) adduct of an acyclic hydrocarbon polyene containing 5 to 10 carbon atoms and 2 to 4 conjugated double bonds in the polyene molecule.

9. A polymer of bis ($NF_2$) adduct of 1,3,5-hexatriene containing the recurring unit:

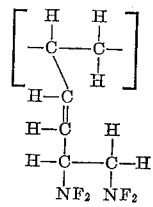

10. Process of forming a bis $NF_2$ adduct of an acyclic hydrocarbon polyene containing 5 to 10 carbon atoms and 2 to 4 conjugated double bonds in the polyene molecule which comprises reacting the polyene with an equimolar proportion of $N_2F_4$ under an absolute pressure of 1 to 15 p.s.i. at a temperature of about 20° C. to about 100° C.

11. Process of forming $NF_2$ adducts of an acyclic hydrocarbon polyene containing 5 to 10 carbon atoms and 2 to 4 conjugated double bonds in the polyene molecule which comprises reacting the polyene with an equimolar proportion of $N_2F_4$ in an initial stage under a pressure of 1 to 15 p.s.i.a at a temperature of about 20° C. to 100° C. to form the bis ($NF_2$) adduct of the polyene, then in a subsequent stage reacting the bis ($NF_2$) adduct with enough $N_2F_4$ at an increased temperature in the range of 80° C. to about 350° C. and under increased pressure in the range of about 15 to 3000 p.s.i.a. to form a higher $NF_2$ adduct of the polyene.

12. Process for preparing a polymer containing in a chain recurring units of hydrocarbon groups having attached $NF_2$ groups which comprises forming a polymerizable bis ($NF_2$) adduct of a $C_5$ to $C_{10}$ acyclic hydrocarbon polyene having 2 to 4 conjugated double bonds in the polyene molecule by reacting the polyene with a 1:1 molar proportion of $N_2F_4$ at about 20° to 100° C. under pressures of about 1 to 15 p.s.i.a., and for a period of about 1 to 20 hours and thereafter polymerizing the bis adduct by letting it stand at room temperature in contact with air until a viscous oily polymer is formed.

13. Process as in claim 12 wherein hexatriene is the polyene and its bis ($NF_2$) adduct is polymerized.

14. Process for preparing a hexakis ($NF_2$) adduct of an acyclic hydrocarbon polyene containing 6 to 10 carbon atoms and 3 to 4 conjugated bonds in the polyene molecule mixed with polymer of $NF_2$ adduct of the polyene, which comprises reacting the polyene with $N_2F_4$ in a first stage under sufficiently mild reaction conditions of 20° to 100° C. and 1 to 15 p.s.i.a. pressure to form a bis ($NF_2$) adduct of the polyene, reacting the bis ($NF_2$) adduct with $N_2F_4$ in a second stage under more stringent conditions of 80° to 200° C. and 15 to 500 p.s.i.a. pressure to form a tetrakis ($NF_2$) adduct of the polyene, and reacting adduct product of said second stage with $N_2F_4$ under more stringent conditions of 100° to 350° C. and a pressure of 300 to 3000 p.s.i.a. to form mixed hexakis adduct and polymer product having a higher content of $NF_2$ than the tetrakis adduct.

15. The process as in claim 14, wherein hexatriene is the polyene reacted in the first stage with $N_2F_4$ and the third stage product is a mixture of $NF_2$ adducts and polymers having a higher $NF_2$ content than tetrakis ($NF_2$) hexene.

No references cited.

CHARLES B. PARKER, Primary Examiner.

L. D. ROSDOL, R. L. CAMPBELL, Examiners.

J. W. WHISLER, BERNARD BILLIAN,
*Assistant Examiners.*